United States Patent [19]

Meszaros

[11] Patent Number: 5,470,356
[45] Date of Patent: Nov. 28, 1995

[54] SULFUR DYE COMPOSITIONS AND THEIR PRODUCTION

[76] Inventor: Laszlo A. Meszaros, Rte. 1, Box 3110, Mt. Gilead, N.C. 27306

[21] Appl. No.: 955,615

[22] Filed: Oct. 2, 1992

Related U.S. Application Data

[63] Continuation-in-part of Ser. No. 775,672, Oct. 11, 1991, abandoned.

[51] Int. Cl.$^6$ .................................................. C09B 49/00
[52] U.S. Cl. .................... 8/652; 8/650; 8/607; 8/611
[58] Field of Search ..................... 8/650, 651, 652; 106/503

[56] References Cited

U.S. PATENT DOCUMENTS

| | | | |
|---|---|---|---|
| 665,737 | 1/1901 | Haussmann | 8/652 X |
| 1,095,237 | 5/1914 | Schmidt | 8/652 |
| 2,893,994 | 7/1959 | Helfaer | 546/37 |
| 4,917,706 | 4/1990 | Meszaros | 8/652 |
| 4,992,078 | 2/1991 | Meszaros | 8/444 |

FOREIGN PATENT DOCUMENTS 705936  3/1954  United Kingdom .

OTHER PUBLICATIONS

D. G. Orton in Venkataraman's "*The Chemistry of Synthetic Dyes*", vol. VII, (Academic Press), 1974, p. 33.

*Primary Examiner*—Margaret Einsmann
*Attorney, Agent, or Firm*—Robert S. Honor; Carl W. Battle; Thomas C. Doyle

[57] ABSTRACT

A sulfur dye or sulfurized vat dye is treated in an aqueous reducing medium, preferably an aqueous mixture of alkali and reducing sugar, to form a solution which is then oxidized to form particles of the dye having improved characteristics.

31 Claims, No Drawings

SULFUR DYE COMPOSITIONS AND THEIR PRODUCTION

This is a Continuation-in-Part of application Ser. No. 07/775,672, filed Oct. 11, 1991 now abandoned.

This invention relates to aqueous solutions of reduced sulfur and sulfurized vat dyes, to aqueous compositions containing sulfur and sulfurized vat dyes in finely divided solid particulate form prepared from such solutions, to dry composition of such dyes and to processes for producing and using such products.

It is known to prepare aqueous sulfur dye dispersions by a process which employs washing and filtration to separate oxidized sulfur dyes from the salts which accompany their production. For the purpose of such filtration, the more uniform the particle size, i.e. the narrower the particle size distribution, the better. It is also desirable that the sulfur dye be in the form of finely divided particles. The minimum particle size is dictated mainly by the pore size of the filter used for the filtration, since particles which are too small will either pass through the pores and be lost or they will clog up the pores and hinder the filtration process. The maximum particle size is dictated mainly by the ultimate uses in the dyeing of textiles, it having been found that oxidized sulfur dyes whose particle size does not exceed 4 microns are particularly well suited for this use, especially when environment-friendly reducing sugars, such as glucose, are to be employed as reducing agents during the dyeing process. Dyes of such small particle size are also less likely to contain entrapped inorganic salts which might not be effectively removed by the washing and filtration treatment and whose presence might adversely affect the dyeings made with such dyes. It has often been found necessary to subject the oxidized sulfur dye to a particle size reduction treatment. This can occasionally be achieved to a satisfactory degree by the use of a high shear pump during a microfiltration procedure, but it is sometimes necessary to carry out a milling step. It has been found, moreover, that some sulfur dyes in the oxidized state in which they are obtained from their conventional manufacturing processes comprise particles which, due to their hardness, require extensive milling in order to achieve a satisfactory particle size as described above. The resulting consumption of time and energy can add significantly to the cost or producing dispersions of such dyes. It has also been found that with some oxidized sulfur dyes prepared according to known methods it is difficult to prepare an aqueous dispersion of high enough concentration to achieve a commercially acceptable color strength, because such dispersions tend to be too thick and difficult to pour.

I have invented a process whereby oxidized sulfur and sulfurized vat dyes are obtained in the form of finely divided particles which are of an improved character by virtue of being of more uniform particle size and/or of a size which is suitable for use in dyeing with less milling than has previously been required or with no milling at all. Furthermore, the particles are sufficiently soft to permit easy and economical size reduction of any oversized particles and they can be processed into aqueous dispersions (pastes) which are easily pourable.

The process of the present invention comprises the steps of 1) treating a starting sulfur dye or a sulfurized vat dye in an amount of a non-sulfide reducing agent-containing aqueous reducing medium which is effective to dissolve any solid particles of the dye preferably all of said particles, and produce an aqueous solution of the reduced form of the dye which can be oxidized to produce an aqueous slurry of precipitated solid particles of the dye which are more uniform in size and/or softer and/or of smaller average particle size than and/or which contain less bound and/or free sulfur than particles obtainable by oxidizing an aqueous composition of the starting dye, and 2) oxidizing the solution obtained in step (1) to produce said slurry of precipitated solid particles of the dye.

The starting dye for the process of this invention can be any sulfur dye or sulfurized vat dye prepared by a thionation reaction but not treated according to step 1) above and having at least one of the characteristics 1, 2 and 3 listed below. Sulfur dyes and sulfurized vat dyes are well known in the art (e.g. VENKATARAMAN "The Chemistry of Synthetic Dyes" Vol. II, Chapters XXXV and XXXVI (1952) and Vol. VII (1974)) and conventional methods of producing them are described in the Colour Index. The dye is preferably employed in the crude form in which it is obtained from its conventional method of production, more preferably as fresh crude which has been recently produced, e.g. no more than one week, particularly less than four days previously. Characteristics 1, 2 and 3 are as follows:

1. The dye is at least partially in water-insoluble solid form, especially in the form of solid particles which are less uniform than is desired and/or whose average size is so large (e.g. greater than 8 microns, typically 10 to 80 microns) as not to be ideally suited, as such, for dyeing cotton in the presence of a reducing sugar as the reducing agent, particularly where such particles are of a hardness which would require extensive milling to achieve a suitable size. In this regard, particle size is preferably as may be determined by laser light diffraction using a "Malvern Mastersizer" Model MS 1002 by Malvern Instruments, Malvern, England.

2. The dye contains an undesirably high amount of bound sulfur. By "bound sulfur" is meant one or more sulfur atoms in excess of the sulfur atom of a thiol group which are part of a linear chain covalently attached to the chromophore of the dye and forming a linkage between said chromophore and said thiol group, e.g. as in D-S-S-Na where D is the chromophore. Bound sulfur can be reduced to sulfides by the treatment of the dye according to Step (1) of the present invention and this causes an increase in the reduction equivalent of the reaction mixture. The term "reduction equivalent" (hereinafter "RE") is used to designate the value which can be readily determined by a person skilled in the art by potentiometric titration with ammoniacal cupric sulfate solution of known normality e.g. 0.1 or 0.2N. It is equal to the number of milliliters of 0.1N cupric ammonium sulfate solution consumed per gram of sample to reach the equivalence point. (An equivalence point or end point of −200 mV has been found effective when employing a Mettler DL 70 Autotitrater with a DM 140-SC electrode or a Fisher Titration Buret No. 455 with a platinum electrode, a Fisher Stirrer No. 460 and a Fisher Titration Printer Plotter No. 465.) Another indication of the presence of bound sulfur is the viscosity of a dispersion of sulfur dye which has been solubilized by reduction and precipitated as described above and then filtered, e.g. by microfiltration, and processed into an aqueous dispersion. By "an undesirably high amount of bound sulfur" is meant such an amount as will cause the dye to form pastes which are too thick or become too thick on standing, unless a sufficient amount of the bound sulfur is removed by a treatment according to this invention. The presence of bound sulfur can also be determined analytically by calorimetric titration with sodium cyanide. When sodium cyanide is added to an aqueous solution of a dyestuff containing bound sulfur an exothermic reaction takes place. To determine the amount of bound sulfur a sample of the aqueous dye composition to be tested, typically 50 g crude starting dye diluted with water to 125 g, is adjusted to a pH above 8 in an insulated vessel and sodium cyanide is added with stirring in one gram increments until there is no longer any increase in temperature caused by such an addition. The dry weight of the sample and the total number of grams of sodium cyanide which caused a temperature rise are determined and the percentage of bound sulfur based on the dry weight of the dye is calculated according to the equation:

$$\frac{\text{g NaCN} \times 32 \times 100}{49 \times \text{g. Sample}} = \%S$$

3. The dye contains an undesirably high amount of free (elemental) sulfur, e.g. sulfur which may not have reacted during the preparation of the polysulfide used in the thionation reaction whereby the dye was produced. Since free sulfur, like bound sulfur, is converted to sulfide by the appropriate reducing medium, its presence is also indicated by an increase in RE during the reduction step. If an insufficient amount of the free sulfur is eliminated by the reduction step, this also causes the final dye dispersion to be too thick. The presence of free sulfur can also be determined analytically, for example by extracting the free sulfur from a sample of dye using carbon disulfide and then comparing the thus-obtained solution with standard solutions of various concentrations of sulfur in carbon disulfide using, for instance, an HP 5988A Mass Spectrometer with a direct insertion probe.

The process of this invention is particularly advantageous for treating dyes which have at least one of characteristics 2 and 3 as well as dyes having characteristic 1 and characteristic(s) 2 and/or 3. Dyes which can be improved by treatment according to this invention include C.I. Sulfur Blacks 1 and 2, C.I. Sulfur Blues 7 and 13, C.I. Sulfur Browns 10 and 31, C.I. Sulfur Green 2, C.I. Sulfur Yellow 1 and C.I. Vat Blue 43, especially C.I. Sulfur Black 1.

The aqueous reducing medium should preferably contain enough reducing agent to reduce all of the non-reduced dye present in a thionation reaction product and produce an aqueous solution from which the dissolved dye can be precipitated by oxidation to form particles having at least one of the aforementioned improved properties of softness, smaller average particle size, more uniform particle size and decreased bound and/or free sulfur compared with particles obtainable by merely oxidizing an aqueous composition of the starting dye.

The reducing medium is an aqueous alkaline medium containing a non-sulfide reducing agent which is capable of reducing a sulfur dye or sulfurized vat dye, such as sodium borohydride, α-hydroxy-acetone, thiourea dioxide or, more preferably, a reducing sugar. By "non-sulfide reducing agent" is meant a reducing agent which is not a sulfide.

The alkali used to produce the aqueous alkaline medium is usually an alkali metal hydroxide, carbonate or phosphate (e.g. tetrasodium pyrophosphate, trisodium phosphate or disodium phosphate) or sodium metabisulfite, preferably potassium hydroxide or sodium hydroxide, especially the latter.

As the reducing sugar, there may be used any of those carbohydrates or combinations thereof which reduce Fehling solution, e.g. aldopentoses, such as L-arabinose, D-ribose and D-xylose; hexoses, such as D-glucose, D-fructose, D-mannose and D-galactose; and disaccharides, such as cellobiose, lactose and maltose. Products such as corn syrup, invert sugar and molasses, which contain reducing sugar, may also be used, as may dextrose prepared in situ from sucrose. The preferred reducing sugar is D-glucose.

As is well recognized in the art, sulfur dyes and sulfurized vat dyes may differ considerably one from another and are described in the literature, e.g. the Colour Index, in terms of the method whereby they are produced rather than by their exact chemical structure. Even the thionation reaction product for a particular dye may differ somewhat from lot to lot. Accordingly, it is recommended to test a sample of the thionation product first. For a starting dye which has not previously been treated according to this invention it is recommended to carry out a trial reduction by treating a sample of the starting dye (i.e. the thionation reaction product) with aqueous reducing medium to a clear solution having a certain RE value and further process the solution to a dye paste in the manner disclosed hereinafter. The resulting paste is then evaluated with respect to its viscosity, particle size and salt-affected dyeing properties. If all of these properties are found to be satisfactory, the remainder of the starting dye can be processed in the same manner. If any such property is not satisfactory, then one or more additional trials can be carried out with adjustments in one or more of the conditions of the reduction, oxidation and/or filtration stages, e.g. amounts and types of reactants, temperatures, pH's and times (including any milling step which may be found necessary to supplement the reduction-oxidation to obtain a particular desired particle size), so as to achieve, for example, a different RE for the reduction product and/or a different degree of oxidation, whereby the final product has all of the desired properties. For a starting dye which is otherwise the same as one which has been treated previously according to this invention, but which is from a different lot, a trial can be carried out using the same conditions which were successful with the previous treatment. If the trial product is unacceptable with respect to one or more properties, then the trial can be repeated with appropriate adjustments as discussed above. Before a trial is carried out it may be advantageous to compare the bound and free sulfur content of the dye with that of the same dye which was previously treated and make appropriate initial adjustments, if necessary, in the reduction and/or oxidation conditions.

The process of this invention is preferably carried out so as to produce a dye slurry which, after being filtered and, if necessary, milled, will yield dye particles which, when mixed with a suitable dispersant, will form a stable aqueous dispersion (paste) of sufficient concentration to impart industrially acceptable color strength (i.e. at least matching the color strength of a commercially acceptable, preferably presently marketed, corresponding prereduced liquid composition of the same dye) having at least one of the following improved properties:

A. At least 50%, preferably at least 90%, more preferably at least 99%, of the particles of a size smaller than 10 microns, preferably smaller than 4.0 microns, more preferably smaller than 3.0 microns, as measured by a "Malvern Mastersizer" Model MS 1002 particle size analyzer.

B. A time of 60 seconds or less in the Dan River Filter Test.

C. A rotational viscosity no higher than 500 cP, preferably no higher than 200 cP, when measured at 22° C. using a Brookfield Digital Viscometer, Model LV, a No. 2 spindle, a setting of 1.5 rpm and a factor 10.

The Dan River Filter Test is carried out as follows:

Two and one half grams of the dye paste are stirred in 250 ml. deionized water for 60 seconds using a magnetic stirrer and then heated with agitation to 71° C. A #2 Whatman filter paper (11 cm.) is placed smooth side up on top of a #4 Whatman filter paper (11 cm.), also smooth side up, in an 11 cm Buchner funnel equipped with a vacuum pump with trap and vacuum flask. The vacuum pump is turned on to establish a vacuum of 20 to 25 inches of mercury and the heated aqueous dye mixture is poured into the funnel. The time is measured from when the pouring is started to when the filter paper is first seen again. The #2 filter paper has a retention of 8 microns; the #4 filter paper has a retention of 20–25 microns.

More preferably, the paste will have all three of the above properties A, B and C. Such a paste of C.I. Sulfur Black 1 having a solids content of 20–30%, when used in an amount of 20 oz./gal. gives a dyeing at least equal to the 3/1 standard depth dyeing obtained with the same amount of the commercial prereduced liquid composition of C.I. Sulfur Black 1.

The steps of treating the starting thionation reaction product with the reducing medium and oxidizing the resulting solution can be carried out so as to produce an aqueous slurry in which the particles are of such size e.g. 0.1 to 50 microns and softness that they can be processed into an aqueous dispersion which will pass the Dan River Filter Test with less milling than would be required to produce such a dispersion from particles of the starting dye or from particles produced by merely oxidizing an aqueous thionation product comprising the starting dye. Said steps can be carried out so that at least 95%, even at least 99%, of the precipitated dye particles are larger than 0.3 micron and 100% are larger than 0.1 micron. While reduction of oversized particles can be achieved during microfiltration or by milling, the reduction and oxidation steps can be carried out so that at least 50%, even at least 75%, or at least 85% of the dye particles are smaller than 10 microns as they precipitate and so that at least 95% of the particles are smaller than 30 microns. However, it is also within the scope of this invention to carry out the reduction and oxidation so that larger particles e.g. mainly in the range 10–50 microns are obtained followed by more extensive milling.

With particular regard to the first step, whereby any solid dye is dissolved and, when too much bound and/or free sulfur is present, the RE of the reaction mixture is increased as a result of the reducing action of the aqueous alkali/reducing agent, the amounts of alkali and reducing agent and the duration and temperature of the reaction should be such as to assure the desired results.

When the starting dye is at least partially in water-insoluble solid form, like crude C.I. Sulfur Black 1, the amounts of alkali and reducing agent, preferably reducing sugar, and the reaction time and temperature should be sufficient to completely dissolve the solid dye. In particular, they should be sufficient to form a clear solution as indicated by the following spot test: A sample of the reaction mixture is cooled to about 400° C. and spotted on P8 Creped Filter Paper (Catalog No. 09-790-12 Allied Fischer Scientific). A clear solution is indicated by a rapid (less than 5 seconds) spreading of the solution on the paper without any solid dye residue, preferably without any solid residue of any type, in the middle of the spot.

When the starting dye contains an undesirably high amount of bound and/or free sulfur, i.e. such an amount as would cause the dye paste (dispersion) prepared therefrom as discussed above to be too thick (i.e. viscosity above 500 cP), the amounts of alkali and nonsulfide reducing agent, preferably reducing sugar, and the reaction time and temperature should be sufficient to reduce at least part of said bound and/or free sulfur and thereby cause an increase in the RE of the reaction mixture over the RE of the starting dye product of the thionation reaction. Preferably, they should be sufficient to reduce enough free and/or bound sulfur to leave a dye which can be processed into an easily pourable dye paste having a viscosity less than 500 cP, preferably less than 200 cP. More preferably, the conditions of the reduction are such as to effect reduction of all of the free sulfur. With some dyes which are highly soluble in water, for example dyes containing a solubility-enhancing number of thiol groups, particularly C.I. Sulfur Black 1, it is preferred that the reduction conditions be such as to also reduce all of the bound sulfur. This is done by carrying out the reduction under conditions whereby the RE is caused to increase until it will increase no more. On the other hand, with some dyes, particularly those of lower solubility in water, such as C.I. Sulfur Blue 13, which contains only two thiol groups per molecule, the retention of some bound sulfur may be desirable when an aqueous dispersion (paste) of such a dye is to be used in conjunction with a reducing sugar in a dyeing process. The retained sulfur is available to be converted to sulfides by the reducing sugar in the dyeing process so as to achieve a satisfactory reduction potential to assure even penetration of the dye into the fabric. (Of course, even with dyes of this latter type one can remove all of the bound sulfur when the final dye product is intended for use with added sodium sulfide as reducing agent.) The skilled artisan can determine for each dye how much free and/or bound sulfur is desirable for the proper balance of pourability and even dyeing and adjust the reaction parameters so as to lower the content of such sulfur and correspondingly increase the RE to the appropriate levels.

In general, the amount of alkali should be sufficient to give the aqueous mixture of dye, alkali and reducing agent an initial pH of at least 11, preferably at least 12, more preferably at least 13. During reduction with a reducing sugar the pH may decrease somewhat due to the conversion of the reducing sugar to carboxylic acids. Preferably, sufficient alkali is employed so that during the reduction step the pH of the mixture does not decrease by more than two units, more preferably not more than one unit, from its initial value before the desired dissolution of the dye and/or increase in RE has taken place. At the very least, the amount of alkali should be sufficient to maintain the pH above 10 throughout the reduction. When the alkali is sodium hydroxide, the amount used is typically in the range 1 to 60, more typically 5 to 30, parts by weight per 100 parts, based on the dry weight, of the starting thionation reaction product. With C.I. Sulfur Black 1 good results are obtained using 5 to 15 parts, by weight, sodium hydroxide per 100 parts, by weight, of the whole crude thionation reaction product. Amounts nearer the higher ends of these ranges favor the production of smaller particles indicated above.

The amount of reducing agent will vary depending on the reducing power of the particular reducing agent employed and the characteristics of the particular dye being treated. However, it will be within the skill of the art to make that determination, as by carrying out one or more trials as discussed above. Usually the amount of reducing sugar will be at least 3, more usually at least 7 parts, by weight, per 100 parts, based on dry weight, of the starting thionation reaction product. With C.I. Sulfur Black 1 good results are obtained using at least 4, preferably 5 to 10 parts, by weight, glucose per 100 parts by weight of the whole crude thionation reaction product. Amounts nearer the higher ends of the ranges favor the production of the smaller particles indicated above.

Preferably, no sulfide other than what may already be present in the starting dye is introduced into the reduction reaction mixture. More preferably, a reducing sugar or mixture thereof is the only reducing agent added.

The amount of water is not critical. With dyes, such as C.I. Sulfur Black 1, whose crude thionation reaction products comprise an aqueous mixture, it may not be necessary to add any additional water. On the other hand, where the thionation reaction product is obtained in the form of a melt or a solid with little or no water, sufficient water should be added so that all of the dye can become dissolved therein to form a clear solution during the reduction step. Typically the amount of water is such that following the oxidation step the solids content of the resulting slurry is in the range 4 to 30%, by weight.

The aqueous mixture of dye, alkali and reducing agent is preferably heated to a temperature of at least 50°, preferably at least 80° C. Usually the maximum temperature is about 107° C., especially 99° C. The duration of the heating step should be sufficient to dissolve any solid dye and, if there is too much bound and/or free sulfur present, to raise the RE of the reaction mixture over that of the starting thionation product, preferably by at least 5 units, more preferably by at least 8 units.

Where the starting dye is C.I. Sulfur Black 1, in particular the crude product of the thionation reaction whereby this dye is produced, the reaction parameters should be such as to completely dissolve the dye to a clear solution and advantageously to completely reduce the bound and free sulfur which characterizes this dye as produced. Preferably, this reduction is effected at a pH maintained in the range 10.5 to 13.8 with an amount of reducing sugar, advantageously glucose, of at least 4 parts, preferably 5 to 10 parts, more preferably 7 to 7.5 parts, per 100 parts of the starting dye product at a temperature in the range 60° to 105° C., more preferably 75° to 99° C., most preferably 90°–99° C. for a sufficient time to raise the RE from an initial value of about 0 to 10 to a final value of about 5 to 35, more usually from an initial value of 0 to 3 to a final value of 10 to 25. Temperatures nearer the upper ends of the specified ranges favor the production of smaller particles.

The reduction step of this process also has the effect of reducing disulfide groups which are present as links between pairs of chromophoric groups in sulfur dye and sulfurized vat dye molecules produced by a thionation process. A mixture of reducing sugar and alkali above 80° C. provides a strong reducing medium wherein the bound and/or free sulfur is reduced to sulfides and the reducing sugar is oxidized. At the same time disulfide links between chromophoric groups are also reduced to sodium thiolate moieties and this reaction does not contribute to any significant increase in the RE of the reaction mixture. However, where the reduction step is carried out to achieve a maximum RE, indicating substantially complete elimination of bound and free sulfur, as in the case of C.I. Sulfur Black 1, all of the disulfide linkages should have been eliminated by the time that stage of the reaction is reached, so that the resulting solution is one in which the reduced dye is completely in the form of molecules containing a single chromophoric group. Such solutions constitute a further aspect of the present invention. They are particularly suitable for further treatment according to the process of this invention to form dispersions in which the dye particles are of the preferred smaller sizes. Also, slurries produced by oxidizing such solutions are especially suited for further processing to produce spray dried particles.

In the second stage of the process of this invention the solution obtained according to the first stage, as described above, is oxidized to effect precipitation of the dye, preferably at least 95% of the dye, most preferably complete precipitation. A convenient test for determining whether a sufficient proportion of the dye has precipitated is to spot a representative sample of the resulting slurry on P8 Crepe filter paper at 40° C. The greater the proportion of dye which has precipitated, the more dye solids will be in the center of the spot and the less colored will be the run out (spread) of the spot. With the preferred degree of oxidation only the center of the spot will contain solids and the surrounding run out will be water clear.

Oxidation is preferably carried out using an oxidizing agent, e.g. by oxygenating with oxygen or a suitable source of oxygen, such as hydrogen peroxide or, most preferably, air.

The rate of oxidation is not critical. For example, it is enough to introduce air at a rate such as to cause a satisfactory bubbling rate through the aqueous dye composition resulting from the reduction step so as to achieve an acceptable oxidation rate without excessive foaming.

During oxidation sulfides present in the dye solution are oxidized, resulting in a lowering of the sulfide content and an accompanying decrease in the reduction equivalent (RE). Preferably, the oxidation is carried out so as to lower the sulfide content to an extent that the RE of the resulting slurry is no higher than 2. More preferably, it is carried out so as to completely oxidize the sulfides and render the resulting slurry sulfide-free as indicated by an RE of zero. Another method of determining whether the oxidized slurry is sufficiently free of sulfides is to adjust the pH of a sample of the slurry at 25° C. to 1 with 36% hydrochloric acid and test the space no more than two inches directly above the slurry, while stirring, with wet lead acetate paper. There should be no change in the color of the paper.

Oxidation (preferably aeration) may be carried out at a temperature in the range 10° to 100° C., preferably 25° to 85° C., more preferably 30° to 50° C., most preferably 37° to 43° C. Temperatures at the lower ends of these ranges favor the formation of smaller particles. With C.I. Sulfur Black 1 especially good results have been achieved at a temperature of about 40° C. However, at an oxidation temperature of 80° C. C.I. Sulfur Black 1 slurries can be obtained containing particles of median sizes in the range of about 7 to 18 microns which are of sufficient uniformity to be suited for further treatment by conventional filtration and sufficiently softer than particles of the starting crude dye as to be more easily milled to a smaller particle size.

Oxidation is carried out at a pH of 7 to 13, preferably 8 to 11, more preferably 9.5 to 10.5. With C.I. Sulfur Black 1 especially good results have been obtained at pH 9.7–9.8 when particles smaller than 4 microns have been desired and at pH 8.3–8.5 when particles in the range of about 7 to 18 microns have been desired. In order to prevent the pH from exceeding the upper limit of the selected range, it is usually necessary to add an acid during part of the oxidation procedure, particularly during the early stages. The acid may be organic or inorganic, such as acetic, sulfuric or phosphoric acid. Preferably, the pH is monitored continuously with a pH meter and the appropriate amount of acid is added to correct any deviation from the predetermined pH range. The addition of acid is discontinued when such addition is no longer necessary to keep the pH from rising. The acid should be added at such a rate or in such a way as to minimize undesired local development of $H_2S$ or $SO_2$. Of course, appropriate measures obvious to a skilled artisan should be taken to avoid exposure to any hydrogen sulfide gas or sulfur dioxide which might be generated by the addition of the acid.

In general, oxidation is carried out under a combination of the conditions discussed above for a sufficient time that a dye slurry of decreased sulfide content is produced, preferably a slurry in which all of the sulfides have been oxidized, more preferably a sulfide-free slurry in which all of the dye has been precipitated.

More particularly, the oxidation is carried out in such a manner that the product of this step taken with the preceding reduction step and a subsequent filtration and a possible milling or other mechanical particle size reduction treatment will, when combined with one or more appropriate dispersing agents, form a dye dispersion (paste) having at least one of the properties A, B and C described above.

As discussed above, it may be advantageous to submit a sample of the starting dye to a trial treatment to form a dispersion and then make whatever adjustments may be needed in the reduction, oxidation and/or filtration steps as disclosed herein to optimize the properties of the product. Overoxidation (as well as bound and/or free sulfur) may cause the final dispersion to be too thick due to conversion of some precipitated dye back to a more water-soluble form as indicated by an increase in the amount of color in the runout according to the last-mentioned spot test. Therefore, in addition to or instead of adjusting the conditions of the reduction to decrease the amount of bound and/or free sulfur, it may be necessary to adjust the conditions of the oxidation, e.g. to lower the temperature and/or pH or shorten the time of oxygenation. Overoxidation may also result in dye particles which are too large and, therefore, have too great a tendency to settle out from an aqueous dispersion. This may be overcome by adjusting one or more of the oxidation conditions and/or by subjecting the particles to milling and/or other particle size-reducing mechanical action.

The oxidation, preferably, oxygenation, is preferably carried out until no further addition of acid is necessary to keep the pH from rising during oxidation. The exact point at which the oxidation is stopped is not critical. Preferably, it is stopped before the pH drops by more than 1.5 units below the value at which the addition of acid is discontinued. More preferably, it is stopped before there is any decrease in the pH from the value at which the addition of acid is discontinued. The duration of the oxygenation will vary depending on the other parameters, e.g. temperature, pH and the rate at which oxygen is introduced. Typical oxygenation times are 0.5 to 5, preferably 0.5 to 3, hours beyond the point at which the addition of acid is discontinued. For C.I. Sulfur Black 1 the total oxgenation time is usually about 8 to 14, preferably about 8.5 to 10 hours. Using the particle size as a guide, the oxidation is preferably carried out so that 100% of the dye particles are larger than 0.1 micron and at least 95%, more preferably at least 99%, are larger than 0.3 micron and so that at least 50%, more preferably at least 75%, most preferably at least 85% of the dye particles are smaller than 10 microns. However, if larger particles are desired, as may be the case when conventional filtration of the slurry is to be carried out, the oxidation may be extended to promote formation of such larger particles, but it should be terminated before the spot test indicates an increase in the water-solubility of the dye, as discussed above.

Aqueous slurries of sulfur dyes and sulfurized vat dyes obtainable by the process described above constitute a further aspect of the present invention.

Such slurries are characterized by a very low content, preferably a zero content, of inorganic sulfides. Slurries of such low sulfide content have an RE no higher than 2, preferably an RE of zero. Slurries of suitably low inorganic sulfide content are also indicated by the lead acetate test described above.

Preferably, such slurries are further characterized by being useful for the batch dyeing of cellulosic textile materials. Suitable dying methods are well known in the art and are described in the literature, e.g. at page 3649 of the Colour Index, third edition, volume 3. Particularly suitable are the slurries whose particle sizes are as specified above with respect to the product of the oxygenation step.

A further preferred characteristic of the slurries of this invention is that the dye particles are softer than particles of an otherwise identical sulfur dye or sulfurized vat dye which are not produced by the above-described process. This is evidenced by the fact that dye particles in a slurry produced according to this invention, e.g. C.I. Sulfur Black 1, undergo particle size reduction as a result of treatment with ultrasound, e.g. five minutes continuous treatment using the above-described Malvern Mastersizer particle size analyzer, whereas the harder particles of the respective starting dye or of the same dye in a slurry produced by a different method undergo no particle size reduction when submitted to the identical ultrasound treatment.

Another preferred characteristic of the slurries is the narrow and uniform particle size distribution as described above, slurries in which at least 85% of the particles are in the range 0.3 to 3 microns being especially preferred. Slurries of more uniform sized particle are especially well suited for further treatment by filtration, including microfiltration.

Of special interest are the black sulfur dyes, such as C.I. Sulfur Black 2 and most especially C.I. Sulfur Black 1, which, after being reduced and oxidized as described above, are, by virtue of the decreased amount of accompanying sulfur (free and/or bound sulfur) significantly improved insofar as having a decreased tendering effect on cellulosic materials, such as cotton. More particularly, cotton textile material dyed with such a dye shows less deterioration when tested according to AATCC Test Method 26-1983 than does otherwise identical cotton textile material identically dyed with the otherwise identical black dye, particularly dye produced in the same thionation reaction, which has not been treated according to the process of the present invention to lower its content of free and/or bound sulfur. Dyes from which all of the free and bound sulfur has been removed give the greatest improvement with respect to decreased tendering.

The slurries produced as described above may be filtered and washed to separate the dye particles from salts which are present in the slurry, e.g. inorganic sulfates, sulfites and/or thiosulfates. The reduction in salt content is conveniently indicated by a lowering of the conductivity of the aqueous phase of the slurry. Preferably, the washing is effected until the used wash water has a conductivity of less than 2000 micromhos/cm., more preferably less than 400 micromhos/cm., most preferably less than 200 micromhos/cm. The conductivity of the unused wash water is preferably about 50–120 micromhos/cm, more preferably 70–120 micromhos/cm.

The filtration may be carried out using conventional filtration and washing techniques, preferably after adjusting the pH of the slurry to 3 to 9, more preferably 4 to 6, as by the addition of a suitable acid, such as acetic or sulfuric acid. On a laboratory scale a suitable filter paper is Fisher Qualitative Filter Paper P8 Crepe, porosity course, flow rate fast, catalogue number 09-790-12G. A membrane of comparable porosity may be used when operating on a larger scale. The washing of the filtration residue may be carried out as described in U.S. Pat. No. 4,917,706, the disclosure of which, and particularly the portion at column 2, line 67 to column 3, line 39, is incorporated herein by reference.

The slurries produced by the above-described reduction and oxidation steps, being preferably characterized by minimum particle sizes greater than 0.1 micron, are well suited for separation by microfiltration, preferably as described in U.S. Pat. No. 4,992,078, the entire disclosure of which is incorporated herein by reference. In accordance with the preferred procedure as described therein, the pH of the slurry is adjusted to 3.5 to 8.5, more preferably 5 to 6, with a suitable acid, such as acetic or sulfuric acid, and the water content is adjusted to give a solids concentration of about 10 to 35%, by weight. The microfiltration is carried out at about 20°–35° C., more preferably 25°–26° C., with fresh addition of water at a rate equal to the rate at which water is being removed as permeate. This is continued until the conductivity of the permeate has decreased to below 2000 micromhos/cm, more preferably below 400 micromhos/cm, at which point the addition of water is discontinued. The resulting slurry may, if desired, be further concentrated, preferably to a solids content of about 15 to 30%, by weight, by further removal of water without replacement.

The filtered and washed dye particles produced as described above constitute a further aspect of the present invention, such particles being characterized by a very low content or complete absence of inorganic sulfides and other salts and/or decreased hardness and/or a decreased content of bound and/or free sulfur. Dyes which have been treated in this manner have the additional advantage over the product of just the reduction and oxidation steps of being able to produce dyeings of greater tinctorial strength.

The dye particles produced by the reduction and oxidation steps 1) and 2) according to this invention, optionally after having been washed and/or filtered, may be reduced back to the reduced form with aqueous alkali containing a suitable reducing agent, such as an alkali metal sulfide or preferably a non-sulfide such as glucose, as disclosed in U.S. Pat. No. 4,917,706, to produce a pre-reduced dye liquid. Such liquids may be used for dyeing or such liquids, preferably those produced from particles prepared by oxidizing a solution of dye in the form of molecules containing a single chromophoric group, as described above, may be dried, preferably by spray drying to form solid particles. When drying is effected in the presence of air, as preferred, and, as further preferred, from a liquid containing a suitable wetting agent and/or dispersing agent, (e.g. of the type described below) fine particles are produced which are partially in oxidized form but miscible in water and which can be used with a reducing agent and aqueous alkali for dyeing cellulosic material.

Preferably, the filtered and washed dye particles are further processed to form a dispersion which is stable to normal storage for at least three months and preferably for a least six months. By "stable" is meant it will not become too viscous to pour, more preferably not above 200 cps. Such further processing comprises adjusting the solids concentration of the presscake obtained from conventional filtration or of the slurry obtained by microfiltration to that which will give the desired dyeing strength, e.g. about 10 to 35%, by weight, and thoroughly mixing the resulting dye composition with an effective amount of dispersing agent or mixture thereof, such as disclosed at column 3, lines 40–62 of the above-referenced U.S. Pat. No. 4,992,078. Other additives, e.g. hydrotropes and fungicides, may also be included. A typical recipe for a dispersion from presscake comprises 30% dye solids, 7% diethylene glycol, 6% sodium ligninsulfonate, 1% Surfynol$^R$104-E (mixture of ethylene glycol and 2,4,7,9-tetramethyl-5-decyne- 4,7-diol), 0.3% Giv-Gard$^R$DXN (6-acetoxy-2,4-dimethyl-1,3-dioxane) and the balance water. A typical recipe for a dispersion from the microfiltered slurry comprises 200 parts slurry, 4.5 parts Surfynol®104-E, 13 parts Vanisperse®CB, 1 part Giv-Gard$^R$DXN, 8 parts Tamol$^R$SN (sodium salt of alkylnaphthalene sulfonic acid-formaldehyde condensate) and sufficient water to give the desired tinctorial strength. The resulting mixture is then milled, if necessary, to further reduce the particle size until the resulting dispersion will pass the Dan River Filter Test described above. The aforestated percentages and parts are by weight.

Preferably, care is taken to prevent contamination of the dye by ferric ions during the various steps of the process. This may be achieved by carrying out any step wherein such contamination is otherwise likely to occur in the presence of a sequestering agent, such as ethylenediamine tetraacetic acid tetrasodium salt, in an amount effective to reduce and preferably to substantially eliminate such contamination.

The dye dispersions and other dye products produced as described above may be used to dye textile substrates by methods known in the art for dyeing with such dyes, in particular by reduction to the leuco form for application, followed by oxidation. They are especially suited for use in dyeing procedures employing reducing systems which are free from inorganic sulfides, particularly reducing systems based on reducing sugars such as glucose.

These products can be used for dyeing cellulosic fibers of 100% cotton or cotton-polyester blends as well as other fibers, such as triacetate, acetate, acrylics and nylon.

They can be mixed with glucose and sodium hydroxide and applied by padding the resulting mixture on the fabric, followed by steaming at 100°–104° C. for 30–200 seconds and then washing. They can also be applied by conventional batch dyeing methods.

The invention will be illustrated by following examples in which parts and percentages are by weight and temperatures are in degrees centigrade, unless otherwise indicated.

EXAMPLE 1

The pH of 500.0 parts crude C.I. Sulfur Black 1 dye (pH 10.04, RE=1.12) is adjusted to 11.0 with the addition of 5.6 parts sodium hydroxide 50% solution. The crude dye is then mixed with 40.0 parts glucose and heated to 55° C., at which point an additional 106 parts sodium hydroxide 50% solution is added. The resulting mixture is heated to 98° C. with stirring, and held at that temperature for one hour, at which point the dye is in complete solution, as indicated by a solids-free spot in the above-described spot test, and the RE of the solution is 19.0.

The pH of the solution is reduced to 9.8 with the addition of 129.2 parts 25% sulfuric acid and the solution is then cooled to 40° C. and aerated for 13.5 hours at that temperature while the pH of the solution is maintained in the range of 9.75 to 9.80 with the continuous addition of 36.2 parts sulfuric acid 25% solution.

The resulting slurry of the precipitated dye is cooled to 20° C., and 48 parts sulfuric acid 25% solution are added to reduce the pH to 5. Fifty percent of the particles are smaller than 1.96 microns measured by the Malvern Particle Size Analyzer. The dye slurry is filtered using Fisher P8 crepe filter paper described above and the presscake is washed with tap water until the conductivity of the used washing liquid is less than 200 micormhos/cm.

Two hundred parts of the washed presscake having a dry content of 25.68% is mixed with 18.7 parts diethylene glycol, 14.1 parts Vanisperse CB (sodium lingninsulfonate), 0.7 part Giv-Gard DXN and 2.4 parts Surfynol 104E and rolled in a ball mill for 26 hours. The resulting dispersion has a time of less than 30 seconds in the Dan River Filter Test and a viscosity of 123 centipoises. Fifty percent of the particles are smaller than 0.6 micron.

This product may be used to dye cotton in the manner disclosed in Application Example A or B of U.S. Pat. No. 4,992,078.

EXAMPLE 2

500 parts crude C. I Sulfur Black 1 dye are mixed with 35.63 parts dextrose. The resulting mixture is heated to 500° C. and 96.02 parts sodium hydroxide 50% solution are added, after which the resulting mixture is heated to 97° C. and held at that temperature for one hour, whereby a solution is produced having a pH of 10.96 and an RE of 11.12.

The solution is cooled to 40° C. and the pH is adjusted to 9.8 with 87.03 parts 25% sulfuric acid. It is then aerated for 9.25 hours with 43.45 parts 25% sulfuric acid being added as necessary to maintain the pH at 9.8. The resulting slurry is cooled to 25° C. In the resulting slurry 90% of the dye particles are smaller than 3.4 microns, 50% are smaller than 1.61 microns and 99% are at least 0.4 micron.

The pH of the slurry is adjusted to 5.0 with 59.32 parts sulfuric acid 25% and stirred for 1 hour. It is then filtered by conventional filtration and washed with water until the conductivity of the used wash water is below 200 micromhos/cm.

The resulting presscake is milled with dispersing agents to produce a paste having a viscosity of 15 cps.

This product is used to dye cotton by each of the methods disclosed in Application Examples A and B of U.S. Pat. No. 4,992,078.

EXAMPLE 3

Two hundred parts of crude thionation mass of C.I. Sulphur Black 1 (Const. No. 53185) prepared by the usual thionation technique, 10.0 parts glucose, and 21.8 parts sodium hydroxide 50% solution are heated to 90° C., and the mixture is held at that temperature for 0.5 hour. The reduction equivalent of the resulting clear solution is 15.4 increased from the value of 1.54 for the crude black dye. The solution is cooled to 80° C., and the pH is reduced to 9.1 by the addition of 3.3 parts acetic acid 91.3% solution. Then the solution is aerated for 9 hours and 20 minutes until the dye is completely out of solution. The pH of the resulting slurry is then reduced to 5.0 with the addition of 9.37 parts acetic acid 91.3%, and it is held at that pH for one hour. The slurry is filtered, and the filter cake is washed with water until the conductivity of the used washing liquid is less than 200 micromhos/cm. The filtration and the wash have a good steady speed, and the filtrate and the washing liquid do not contain any dye at all. Fifty percent of the particles of the slurry are smaller than 5.58 microns. Under a conventional microscope a highly even distribution of uniform particles can be observed.

EXAMPLE 4

Two hundred fifty parts of crude C.I. Vat Blue 43 (Const. No. 53630) is diluted with 250 parts water and mixed with 35.0 parts glucose and 100 parts sodium hydroxide 50% solution. The resulting mixture is heated to 90° C. and held at that temperature for 0.5 hour, whereby a clear solution is produced.

The solution is cooled to 80° C. and the pH is adjusted to 9.0 by the addition of 81.0 parts sulfuric acid 25% solution. The solution is then aerated for 6 hours and 20 minutes until the dye is completely out of solution. During the aeration 23.44 parts sulfuric acid 25% solution are added as required to maintain the pH at 9.0.

The resulting slurry is adjusted to pH 5 with 13.9 parts sulfuric acid 25% solution. Fifty percent of the particles in this slurry are smaller than 1.05 microns.

EXAMPLES 5–10

Examples 1 and 2 are repeated, except that instead of conventional filtration and washing, the slurry produced in the oxidation step, after being acidified to pH 5, is microfiltered and concentrated as disclosed in Examples 1, 2 and 3 of U.S. Pat. No. 4,992,078.

EXAMPLE 11

To 1000 parts crude C.I. Sulfur Black 1 thionation product are added 10.4 parts 50% aqueous NaOH to adjust the pH to 11.0. To this are added 72 parts of dextrose at 60° and 220 parts of 50% aqueous NaOH at 80°. The resulting mixture is held at 80° for 1 hour, whereby a solution is obtained having a pH of 11.85 and an RE of 8.01.

The solution is cooled to 75° and its pH is adjusted to 8.5 with 369.0 parts of 25% sulfuric acid. The resulting mixture is aerated for 9 hours at 80° while adding 25% $H_2SO_4$ as necessary to maintain the pH at 8.5. A slurry of oxidized sulfur dye is obtained in which 90.3% of the particles are at least 8.8 microns and 89.3% are under 22.2 microns.

The slurry is cooled to below 18°, adjusted to pH 5.0 with 65.4 parts 25% $H_2SO_4$, stirred for one hour and filtered using Fisher P-8 crepe filter paper. The filter cake is washed with water having an initial conductivity of about 150 micromhos/cm. for 40 minutes until the conductivity of the used wash water is 210 micromhos/cm.

To 480.0 parts of the washed filter cake are added 30.2 parts Vanisperse CB, 1.8 parts Giv-Gard DXN, 10.9 parts Surfynol 104-E and 81.9 parts water. The resulting mixture is milled overnight with 10 mm glass marbles and then with 605 parts of 5–7 mm. glass beads to a total milling time of 60.5 hours. The thus-obtained dye paste has a viscosity of 52 cP.

I claim:

1. A process for producing a dye slurry which comprises the steps of
   1) reducing a starting sulfur dye, which contains disulfide groups, in an amount of a non-sulfide reducing agent-containing aqueous reducing medium which is effective to reduce said disulfide groups and dissolve any solid particles of the dye and produce an aqueous solution of the reduced form of the dye which can be oxidized to form an aqueous slurry of precipitated solid particles of the dye which differ from particles obtainable by oxygenating an aqueous composition of the starting dye by virtue of a) being softer, b) being of more uniform particle size, c) being of smaller average particle size, d) containing less bound sulfur, e) containing less free sulfur or f) any combination of a)-e), and
   2) oxidizing the solution obtained in step 1) to produce said slurry of precipitated solid particles of the dye.

2. A process according to claim 1 wherein the starting dye is a sulfur dye prepared by a thionation reaction and having at least one of characteristics 1, 2 and 3:
1. being at least partially in water-insoluble solid form,
2. containing an undesirably high amount of bound sulfur, and
3. containing an undesirably high amount of free sulfur.

3. A process according to claim 2 wherein the starting dye contains solid dye particles and step 1) comprises dissolving all of said particles.

4. A process according to claim 2 wherein the starting dye contains bound sulfur or free sulfur or both and step 1) comprises reducing at least part of said sulfur.

5. A process according to claim 4 wherein step 1) comprises reducing all of the bound and free sulfur.

6. A process according to claim 1 wherein the starting dye is a crude product as obtained from a thionation reaction.

7. A process according to claim 1 wherein the starting dye is C.I. Sulfur Black 1.

8. A process according to claim 1 wherein no sulfide other than what may already be present in the starting dye is added to the reducing medium.

9. A process according to claim 1 wherein the non-sulfide reducing agent is a reducing sugar.

10. A process according to claim 1 which is carried out in the presence of an effective amount of metal sequestering agent to decrease the amount of any ferric ions which may otherwise contaminate the process.

11. A process according to claim 6 wherein step 1) is carried out until the reduction equivalent of the reaction mixture is at least 5 units higher than that of the starting thionation product.

12. A process according to claim 1 wherein step 2) is carried out in the presence of an effective amount of an oxidizing agent.

13. A process according to claim 12 wherein the oxidizing agent is oxygen or a source of oxygen.

14. A process according to claim 12 wherein step 2) is carried out for a sufficient time to lower the reduction equivalent of the oxidation reaction mixture to 2 or less.

15. A process according to claim 12 wherein step 2) is carried out until the oxidation reaction mixture is free of sulfides.

16. A process according to claim 12 wherein step 2) is carried out until the dye is completely precipitated.

17. A process according to claim 1 wherein the dye treated in step (1) is selected from the group consisting of C.I. Sulfur Blacks 1 and 2, C.I. Sulfur Blues 7 and 13, C.I. Sulfur Browns 10 and 31, C.I. Sulfur Green 2 and C.I. Sulfur Yellow 1.

18. A process according to claim 1 wherein the starting dye comprises molecules containing disulfide groups as links between pairs of chromophoric groups and step 1) comprises reducing said disulfide groups.

19. A process according to claim 18 wherein step 1) is carried out until the reduced dye is completely in the form of molecules containing a single chromophoric group.

20. A process according to claim 1 wherein the non-sulfide reducing agent is sodium borohydride, alpha-hydroxyacetone, thiourea dioxide or a reducing sugar.

21. A process according to claim 20 wherein the non-sulfide reducing agent is D-glucose.

22. A process according to claim 7 wherein step 1) is carried out under conditions whereby the reduction equivalent of the reaction mixture is caused to increase until it will increase no more.

23. A process according to claim 15 wherein the aqueous reducing medium contains enough alkali to maintain the pH above 10 throughout the reduction and is heated to a temperature of at least 80° C.

24. A process according to claim 1 wherein the aqueous reducing medium contains enough alkali to maintain the pH above 10 throughout the reduction and is heated to a temperature of at least 80° C.

25. A process according to claim 3 wherein step 2) is carried out until the oxidation reaction mixture is free of sulfides.

26. A process according to claim 25 wherein the starting dye is a crude product obtained from a thionation reaction.

27. A process according to claim 26 wherein no sulfide other than what may already be present in the starting dye is added to the reducing medium.

28. A process according to claim 27 wherein the starting dye is C.I. Sulfur Black 1.

29. A process according to claim 25 wherein the starting dye is C.I. Sulfur Black 1.

30. A process for producing an aqueous dye slurry which comprises the steps of
1) heating crude C.I. Sulfur Black 1 dye in an aqueous alkaline medium containing a reducing sugar for a sufficient time to dissolve all of the solid material in the crude dye and reduce bound and free sulfur contained therein, and
2) oxygenating the resulting solution for a sufficient time to produce a slurry of precipitated solid particles of the dye.

31. A process according to claim 30 wherein no sulfide other than what may already be present in the starting dye is added to the reducing medium and step 2) is carried out until the oxidation reaction mixture is free of sulfides.

\* \* \* \* \*